United States Patent [19]
Okuhara et al.

[11] Patent Number: 5,978,839
[45] Date of Patent: Nov. 2, 1999

[54] DATA SHARING METHOD IN A PLURALITY OF COMPUTER SYSTEMS

[75] Inventors: Susumu Okuhara; Hiroshi Morishima; Shingo Maeda; Kikuko Morishima, all of Yokohama, Japan

[73] Assignee: Hitachi, ltd., Tokyo, Japan

[21] Appl. No.: 08/859,400

[22] Filed: May 20, 1997

[30] Foreign Application Priority Data

May 21, 1996 [JP] Japan .................................. 8-126083

[51] Int. Cl.$^6$ .......................... G06F 13/00; G06F 15/167
[52] U.S. Cl. ........................... 709/215; 711/153; 711/202
[58] Field of Search ........................ 395/200.45, 200.43, 395/200.44, 200.46, 726, 427; 711/152, 153, 162, 163, 147, 148, 150, 202; 710/200; 709/215, 213, 214, 216

[56] References Cited

U.S. PATENT DOCUMENTS

| 5,485,594 | 1/1996 | Foster | 395/427 |
| 5,522,045 | 5/1996 | Sandberg | 709/215 |
| 5,829,041 | 10/1998 | Okamoto et al. | 711/147 |

OTHER PUBLICATIONS

Program Product VOS3/AS Center Operation—JSS3–, pp. 226–239, Hitachi Computers General Information/User Guide, Dec. 1995.

*Primary Examiner*—Dung C. Dinh
*Attorney, Agent, or Firm*—Antonelli, Terry, Stout & Kraus, LLP

[57] ABSTRACT

Processor apparatuses share data, used in common for a plurality of systems, in a global memory in a share system. The global memory is divided into constant units and the individual division units are managed by using identifiers which are definitely determined as viewed from the processor apparatuses and the share system. When an inter-system exclusive state conditioning unit of a processor apparatus designates a desired area on an address space in the processor apparatus by using an identifier to obtain a locked resource, an update state confirming unit checks whether data in a corresponding unit in the share system is updated, and when the data is updated, a data transferring unit transfers the data in the corresponding unit in the share system to the address space. Accordingly, a program operating on each computer system can easily access the data shared by the systems without being aware of the presence of the share system. When the locked resource is released, a data transferring unit transfers the data to the corresponding unit in the share system if the data in the address space is updated.

6 Claims, 5 Drawing Sheets

DATA SHARING METHOD IN A PLURALITY OF COMPUTER SYSTEMS

BACKGROUND OF THE INVENTION

1. Field of the Invention

The present invention relates to data sharing methods and more particularly to a data sharing method in which data used in common for a plurality of computer system is shared by a share system.

2. Description of the Related Art

Conventionally, when data on an address space is shared by a plurality of computer system, a share input/output system is occupied, data is once written to a predetermined position and thereafter the occupied state is released. Subsequently, when another system utilizes the data, the input/output system is similarly occupied, the data at the predetermined position is read and transferred to an area precedently reserved on an address space and thereafter, the occupied state is release. In other words, the individual computer system once occupy the input/output system to perform read/write of data and thereafter release the occupation. Used as the input/output system shared by the plurality of system is, for example, a magnetic storage system, a semiconductor storage system or a stand-alone extended storage system.

A method of sharing data by a plurality of system by using the stand-alone extended storage is described in, for example, a manual "Program Product VOS3/AS Center Operation-JSS3-" published by Hitachi, Ltd., December, 1995, pp. 226–239.

However, when the input/output system serving in a share system is occupied by a conventional system, the effect of overhead due to the exclusive state of the input/output system is increased, raising a problem that even when data of a relatively small amount is accessed frequently, the overhead due to the exclusive state and the access overhead are cumulated and cannot be neglected.

SUMMARY OF THE INVENTION

An object of the present invention is to provide a data sharing method in which a program operating on each computer system can easily access data shared by systems through the procedure similar to that for accessing an area in a system of its own without being aware of the presence of a share system.

To accomplish the above object, the present invention discloses a data sharing method in which data used in common for a plurality of computer systems is shared by a share memory in the share system.

More specifically, the method has a first step of dividing the share memory into constant units and managing the individual division units by using identifiers which are definitely determined as viewed from the plurality of computer systems and the share system. The method has a second step of checking, when a desired area on an address space in a computer system is designated by using an identifier to obtain a locked resource, whether data in a corresponding unit in the share memory is updated and a third step of transferring data in the corresponding unit in the share memory to the address space when the data is updated, whereby when the data in the address space is updated at the time that the locked resource is released, the data which has been transferred to the address space is transferred to the corresponding unit in the share memory. According to the data sharing method of the present invention, a program operating on each computer system can easily access data shared by the systems through the procedure similar to that for accessing an area in a system of its own without being aware of the presence of the shared apparatus.

Preferably, in the data sharing method of the present invention, the computer system may access a group of a plurality of identifiers and obtain a locked resource in the share system by using a representative identifier of the identifier group. In this case, the overhead due to the exclusive state can be reduced.

Preferably, in the data sharing method of the present invention, the access timing at which the computer system looks-up/updates data on the computer system may be made to be asynchronous to the access timing at which data on the share system is reflected upon the computer system. In this case, the overhead for the share system can further be reduced.

DESCRIPTION OF THE PREFERRED EMBODIMENTS

A data sharing method according to an embodiment of the present invention will now be described with reference to FIGS. 1 to 3.

Figure 1:
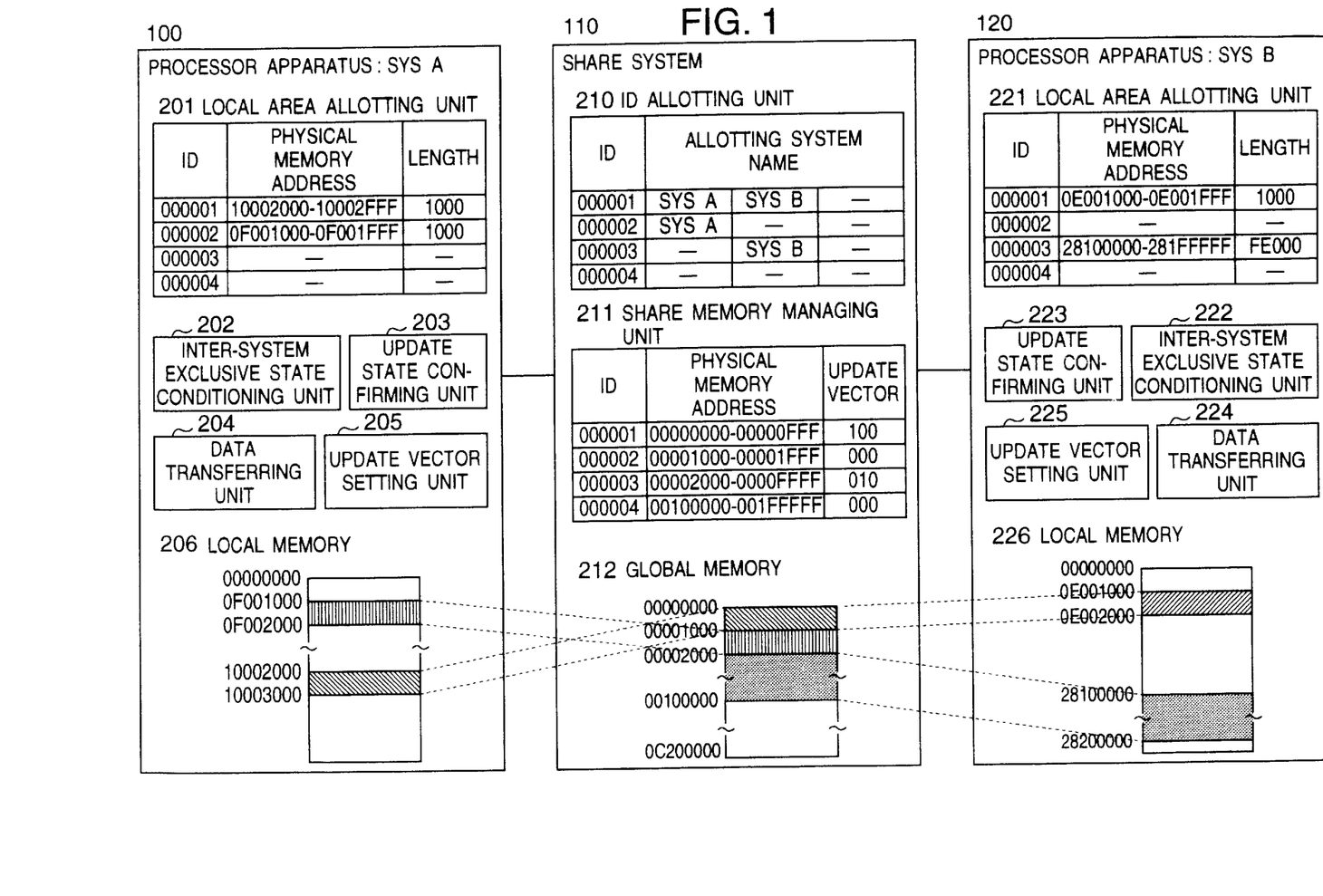
FIG. 1 is a schematic diagram of a composite computer system realizing a data sharing method according to an embodiment of the present invention.

FIG. 1 schematically shows a composite computer system realizing the data sharing method according to the embodiment of the present invention.

A processor apparatus 100 has a local memory 206 which can be looked up using an address space on a system comprised of the processor apparatus 100. A share system 110 which can be shared for use by other processor apparatus or system than the processor apparatus 100 has a global memory 212 usable by the processor apparatus 100. The processor apparatus 100 also has a local area allotting unit 201 for managing memory areas which correspond, in 1:1 relationship, to specified memory areas of global memory 212 managed by different identifiers on the share system 110 and other memory areas on an address space of the local memory 206 in its own system. The local area allotting unit 201 manages the memory areas in the local memory 206 by using a table format having items "identifier (ID)", "physical memory address" and "length".

In the local area allotting unit 201, for example, an area of a length of '1000'X extending from an address '10002000'X ("X" being an abbreviation for the hexadecimal number) to an address '10002FFF'X of the local memory 206 is managed by an ID='000001' and an area of a length of '1000'X extending from an address '0F001000'X to an address '0F001FFF'X of the local memory 206 is managed by an ID='000002'.

The memory areas managed by the ID's '000001' and '000002' are those depicted in the local memory 206.

Further, the processor apparatus 100 has an inter-system exclusive state conditioning unit 202 for conditioning an exclusive state to a different system to obtain/release a locked resource during transfer of data to the share system 110, an update state confirming unit 203 for checking whether data on the share system is updated by the different system, a data transferring unit 204 for transferring data from the local memory 206 on the processor apparatus 100 to the global memory 212 on the share system 110 or from the global memory 212 on the share system 110 to the local memory 206 on the processor apparatus 100, and an update vector setting unit 205 for setting an update vector used to record the update state of the different system on the share system 110. The update vector will be described later.

A processor apparatus 120 is constructed similarly to the processor apparatus 100, having a local area allotting unit 221, an inter-system exclusive state conditioning unit 222, an update state confirming unit 223, a data transferring unit 224, an update vector setting unit 225 and a local memory 226. Each unit has the same function as that of each corresponding unit in the processor apparatus 100 and will not be detailed.

It is recorded in the local area allotting unit 221 that, for example, an area of a length of '1000'X extending from an address '0E001000'X to an address '0E001FFF'X of the local memory 226 is managed by an ID='000001' and an area of a length of 'FE000'X extending from an address '28100000'X to an address '281FFFFF'X of the local memory 226 is managed by an ID='000003'.

The memory areas managed by the ID's '000001' and '000003' are those depicted in the local memory 226.

The share system 110 is coupled to the processor apparatus (SYS A) 100 and the processor apparatus (SYS B) 120 and incorporates its internal memory to fulfil the function of operating data on the memory in accordance with commands from the coupled processor apparatuses 100 and 120. For example, the share system is constructed of a magnetic storage system, a semi-conductor storage system or a stand-alone extended storage system.

The share system 110 which is shared by the plurality of computer systems has, as a means for dividing and managing the memory in the share system, an identifier allotting unit 210 for recording information as to which systems the individual identifiers are allotted to, a share memory managing unit 211 for managing memory areas on an address space of the global memory 212, that is, division units in the memory in conformity with addresses by using identifiers, and the global memory 212 serving as a location where actual data is arranged.

The identifier allotting unit 210 manages allotment of identifiers in a table format having items "identifier (ID)" and "allotting system name". It is recorded in the identifier allotting unit 210 that, for example, an ID='000001' is allotted to the "SYS A" representative of the processor apparatus 100 and the "SYS B" representative of the processor apparatus 120, an ID='000002' is allotted to the "SYS A" and an ID='000003' is allotted to the "SYS B".

The share memory managing unit 211 manages allotment of the memory areas conforming to identifiers in a table format having items "identifier (ID)", "physical memory address" and "update vector". It is recorded in the share memory managing unit 211 that, for example, an area extending from an address '00000000'X to an address '00000FFF'X of the global memory 212 is managed by an ID='000001' with the "update vector" being '100'. Although more details of the "update vector" will be described later, it is to be understood that in the "update vector" of 3 bits, a flag is raised in correspondence to three columns in "allotting system name" of the identifier allotting unit 210. More particularly, in an "update vector"='100' corresponding to the ID='000001', '1' corresponds to "SYS A", the middle '0' of '100' corresponds to "SYS B" and the right end '0' of '100' corresponds to "-" indicative of the absence of allotting system. Since the bit is raised ('1') for the "SYS A", it is indicated that data in a memory area managed by the ID='000001' is updated by the processor apparatus 100 (SYS A).

Similarly, it is recorded in the share memory managing unit 211 that an area extending from an address '00001000'X to an address '00001FFF'X of the global memory 212 is managed by an ID='000002' with the "update vector" being '000' to indicate that this area is not updated by any processor apparatus, an area extending from an address '00002000'X to an address '000FFFFF'X of the global memory 212 is managed by an ID='000003' with the "update vector" being '010' to indicate that this area is updated by the processor apparatus 120 (SYS B) and an area extending from an address '00100000'X to an address '001FFFFF'X of the global memory 212 is managed by an ID='000004' with the "update vector "being '000' to indicate that this area is not updated by any processor apparatus.

The memory areas managed by the ID's ='000001', . . . , '000004' are those depicted in the global memory 212.

Figure 2:
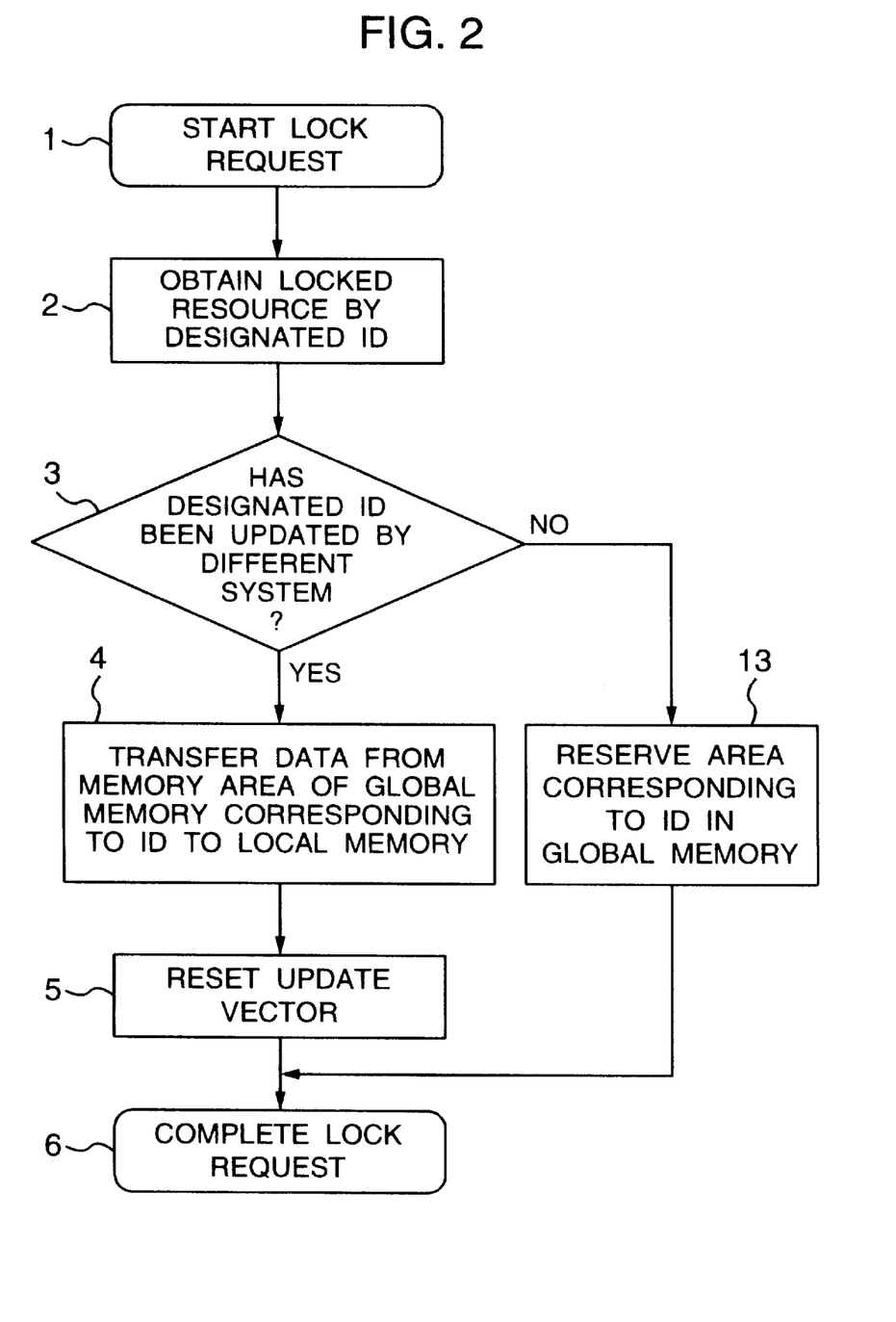
FIG. 2 is a flow chart showing the procedure of the lock requesting process in the data sharing method according to the embodiment of the present invention.

Referring now to FIG. 2, the procedure of looking up the inter-system share memory area, which is defined in common to the plurality of systems, during lock request will be described.

FIG. 2 is a flow chart showing the procedure of the lock requesting process in the data sharing method according to the embodiment of the present invention.

The lock requesting process will be described hereunder in accordance with FIG. 1 by following respective steps shown in FIG. 2. It is now assumed that nothing is recorded in columns of the "allotting system name" in the identifier allotting unit in FIG. 1 and columns of the "update vector" in the share memory managing unit 211 are all '000'.

In step 1 of FIG. 2, a program executed by the processor apparatus 100 issues a lock request in accordance with a program executed by the processor apparatus 120 by using a preset ID='000001' in order to access, in a share memory area to be shared by the systems, an area of a length of '1000'X extending from an address '10002000'X of local memory 206 on a precedently reserved address area.

In step 2 of FIG. 2, the inter-system exclusive state conditioning unit 202 of the processor apparatus 100 obtains a locked resource by using the designated identifier. More particularly, the inter-system exclusive state conditioning unit 202 places the ID='000001' in exclusive state. Thus, a request destined for the ID='000001' from another processor apparatus is not acknowledged but is awaited for acknowledgement.

Next, in step 3, the update state confirming unit 203 of the processor apparatus 100 decides whether the designated identifier has already been updated by a different system. More specifically, the update state confirming unit 203 checks whether the corresponding memory area of the global memory 212 on share system 110 which is in correspondence to the designated identifier has been accessed by the different system. If updated, the program proceeds to step 4 but if not updated, the program proceeds to step 13. Steps 4 and 5 will be described later.

Here, on the assumption that access to the ID='000001' from the processor apparatus 100 is initial, the program proceeds to the step 13.

In the step 13, the processor apparatus 100 sends to the share system 110 a request that the share system 110 should reserve a memory area of a length of '1000'X for the ID='000001'. The identifier allotting unit 210 of the share system 110 makes a record of the fact that the request for allotment to the ID='000001' is issued from the processor apparatus 100 (SYS A) and the share memory managing unit 211 reserves the global memory 212 on the share system 110 by a '1000'X length memory area corresponding to the ID='000001'.

Next, in step 6, the processor apparatus 100 completes the lock request without transferring data because the access is initial in the lock request process on the processor apparatus 100 and the 'update vector' has not been updated by the different system.

Through the above lock request process, the program on the processor apparatus 100 is allowed to access the area which is in correspondence to the identifier. The program of the processor apparatus 100 is also allowed to look up/update this area through the procedure similar to that for accessing an area in the system of its own without using any special instructions.

According to the present embodiment, the area can easily be looked up/updated through the procedure similar to that for accessing an area in the system of its own without using any special instructions.

Next, the procedure of requesting unlock of the inter-system share memory area which is defined in common to the plurality of systems will be described with reference to FIG. 3.

Figure 3:
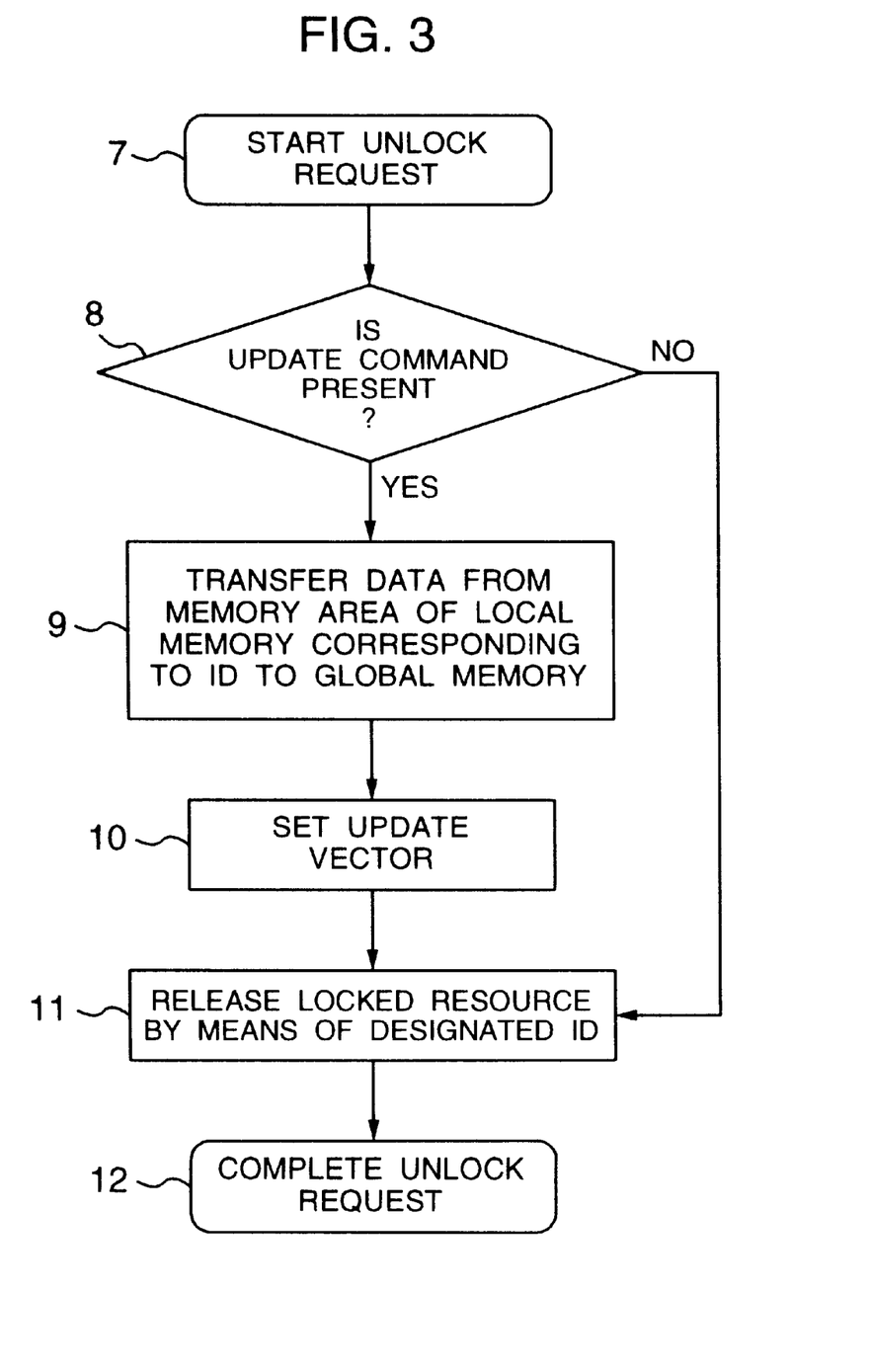
FIG. 3 is a flow chart showing the procedure of the unlock requesting process in the data sharing method according to the embodiment of the present invention.

FIG. 3 is a flow chart showing the procedure of the unlock requesting process in the data sharing method according to the embodiment of the present invention.

In step 7 of FIG. 3, a program on the processor apparatus 100 designates the ID='000001' and issues an unlock request when access to the share area is completed.

In step 8, the processor apparatus 100 decides whether an update command has been present. In the presence of the update command, the program proceeds to step 9 but in the absence of the update command, the program jumps to step 11. When the program on the processor apparatus 100 only looks up the memory area, update is not commanded.

When access to the ID='000001' from the program on the processor apparatus 100 is initial, no data is formed on the global memory 212 and therefore, the processor apparatus 100 commands update.

Next, in the step 9, data is transferred from a memory area of local memory 206 corresponding to the identifier to the global memory 212. More particularly, the data transferring unit 204 transfers the contents of addresses '10002000'X to '10002FFF'X of local memory 206 corresponding to the ID='000001' to addresses '00000000'X to '00000FFF' on the global memory 212.

Subsequently, in step 10, an update vector is set. More specifically, the update vector setting unit 205 changes setting of a bit of the update vector managed by the share memory managing unit 211 from '0'B to '1'B to enable the different system (or processor apparatus) to recognize the completion of update by its own system (or processor apparatus). Here, setting of the "update vector" corresponding to the ID='000001' of the share memory managing unit 211 is changed from '000' to '100'. Since the first allotment is made to the "SYS A" representative of the processor apparatus 100 as will be seen from the record in columns in "allotting system name" of the identifier allotting unit 210, setting of the most significant bit of the update vector is changed from '0'B to '1'B.

Next, in the step 11, the inter-system exclusive state conditioning unit 202 releases the locked resource due to the designated identifier. In other words, the exclusive state of the ID='000001' is released.

In step 12, the program on the processor apparatus 100 completes the unlock request.

In the absence of the update command in the step 8, data on the local memory 206 is not transferred onto the global memory 212 and in the step 11, the inter-system exclusive state conditioning unit 202 executes release of the inter-system locked resource exclusive state due to the designated identifier, and in the step 12, the program ends the unlock requesting process.

Next, the lock requesting process when the different system, for example, the processor apparatus 120 looks up/updates a share memory area allotted by the processor apparatus 100 as described above will be described by also making reference to FIG. 2.

In step 1 of FIG. 2, a program on the processor apparatus 120 issues a lock request in accordance with a program on the processor apparatus 100 and a preset ID='000001' in order to access, as a memory area to be shared by the systems, an area of a length '1000'X extending from a precedently reserved address '0E001000'X of local memory 226 on the address space.

In step 2, the inter-system exclusive state conditioning unit 222 of the processor apparatus 120 obtains a locked resource by using a designated identifier. In other words, the inter-system exclusive state conditioning unit 222 places the ID='000001' in exclusive state.

Next, in step 3, the update state confirming unit 223 of the processor apparatus 120 decides whether the designated identifier has already been undated by a different system. Here, since the update state confirming unit 223 knows that the ID='000001' has already been accessed by the processor apparatus 100 by checking the contents of the update vector managed by the share memory managing unit 211, the program proceeds to step 4.

In the step 4, the data transferring unit 224 transfers data from a memory area of global memory 212 corresponding to the identifier to the local memory 226. More particularly, the data transferring unit 224 transfers the contents of addresses '00000000'X to '00000FFF'X of global memory 212 corresponding to the ID='000001' to addresses '0E001000'X to '0E001FFF'X of the local memory 226 on the processor apparatus 120. Through this data transferring process, data corresponding to the ID='000001' on the processor apparatus 100 coincides with data corresponding to the ID='000001' on the processor apparatus 120.

In step 5, the update vector setting unit 225 of the processor apparatus 120 resets the update vector. More specifically, in order to prevent data from being again read on the processor apparatus 120 after transfer of the data, the update vector setting unit 225 resets a bit of the "update vector" from '1'B to '0'B, where B indicates a number in binary. As a result, the "update vector" corresponding to the ID='000001' is reset from '100' to '000'.

In step 6, the lock request is completed and the program is returned to the request program originator. Then, the program on processor apparatus 120 which has completed the lock request executes look-up/update of data on local memory 226 in correspondence to the ID='000001'.

Next, the unlock requesting process shown in FIG. 3 is executed.

In step 7, an unlock request is issued and in step 8, the update command is decided as to whether to be present. When the look-up/update execution is directed to only look-up, no update command is issued and the locked resource is released in step 11 and the unlock process is completed in step 12.

When the update command is determined to be present in the step 8, data is transferred from the local memory 226 to the global memory 212 in step 9, the update vector is set in step 10, the exclusive state is released in the step 11 and the unlock process ends in the step 12.

By repeating lock→look-up/update →unlock through the processing procedure as above, an area shared by the systems can be accessed. The flow of lock→look-up/ update→unlock is the same procedure as that executed when a share area is looked up/updated by all spaces in a system having a plurality of virtual address spaces but differs therefrom in that no real memory control is carried out. The memory shared by the systems can be accessed as easily as the conventional share area.

As described above, according to the present embodiment, the program can easily look up/update an area of the share memory through the procedure similar to that for accessing an area in the system of its own without using any special instructions.

Figure 4:
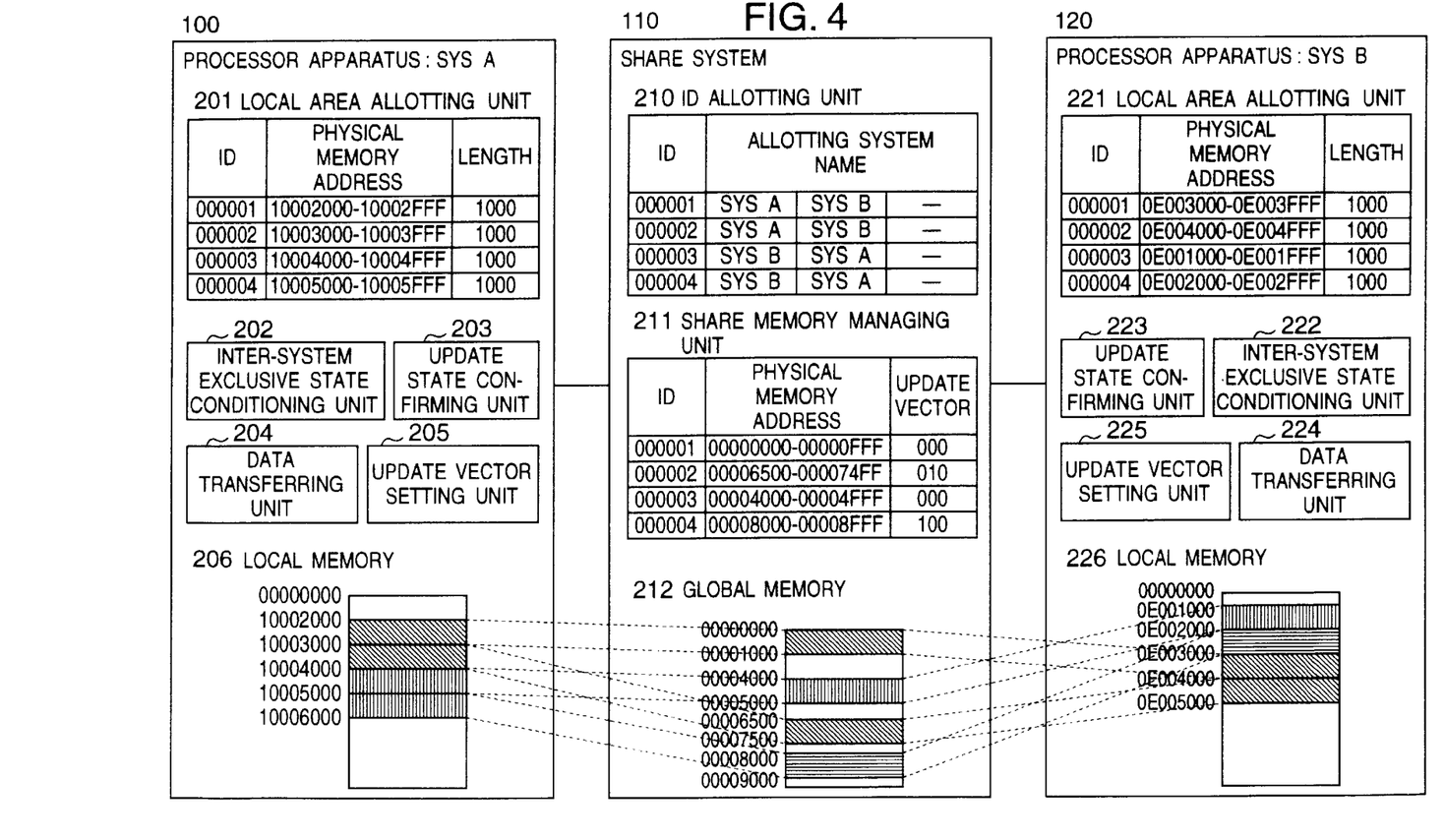
FIG. 4 is a schematic diagram of a composite computer system realizing a data sharing method according to another embodiment of the present invention.

Referring now to FIG. 4, a method will be described in which access operation is carried out by using a group of a plurality of identifiers representative of minimum units of exclusive state.

FIG. 4 schematically shows a composite computer system realizing a data sharing method according to another embodiment of the present invention. Reference numerals identical to those in FIG. 1 designate identical components which are constructed and function identically and will not be detailed.

In the present embodiment, an ID='000001' and an ID='000002' are put together in a group, an ID='000003' and an ID='000004' are put together in another group and these groups are each accessed.

Each of the processor apparatuses 100 and 120 recognizes that the ID='000001' and ID='000002' are put together in one group and it is precedently prescribed in programs on the processor apparatuses 100 and 120 that when a group of the ID='000001' and ID='000002' is accessed, '000001' is used as a representative identifier and when a group of the ID='000003' and ID='000004' is accessed, '000003' is used as a representative identifier.

For example, in the local area allotting unit 201, an area of a length of '1000'X extending from an address '10002000'X to an address '10002FFF'X of the local memory 206 is managed by ID='000001', an area of a length of '1000'X extending from an address '10003000'X to an address '10003FFF'X of the local memory 206 is managed by ID='000002', an area of a length of '1000'X extending from an address '10004000'X to an address '10004FFF'X of the local memory 206 is managed by ID='000003' and an area of a length of '1000'X extending from an address '10005000'X to an address '10005FFF'X is managed by ID='000004'. The memory areas managed by the ID's ='000001', . . . , '000004' are those depicted in the local memory 206.

For example, in the local area allotting unit 221, an area of a length of '1000'X extending from an address '0E003000'X to an address '0E003FFF'X of the local memory 226 is managed by ID='000001', an area of a length of '1000'X extending from an address '0E004000'X to an address '0E004FFF'X of the local memory 226 is managed by ID='000002', an area of a length of '1000'X extending from an address '0E001000'X to an address '0E001FFF'X of the local memory 226 is managed by ID='000003' and an area of a length of '1000'X extending from an address '0E002000'X to an address '0E002FFF'X of the local memory 226 is managed by ID='000004'. The memory areas managed by the ID's ='000001', . . . , '000004' are those depicted in the local memory 226.

Further, it is recorded in the identifier allotting unit 210 that for example, the ID='000001' is allotted to "SYS A" representative of the processor apparatus 100 and "SYS B" representative of the processor apparatus 120, the ID='000002' is allotted to "SYS A" and "SYS B", the ID='000003' is allotted to "SYS B" and "SYS A" and the ID='000004' is allotted to "SYS B" and "SYS A".

Also, it is recorded in the share memory managing unit 211 that for example, an area extending from an address '00000000'X to an address '000000FFF'X of the global memory 212 is managed by ID='000001' with the "update vector" being '000', an area extending from an address '00006500'X to an address '000074FF'X of the global memory 212 is managed by ID='000002' with the "update vector" being '010', an area extending from an address '00004000'X to an address '00004FFF'X of the global memory 212 is managed by ID='000003' with the "update vector" being '000' and an area extending from an address '00008000'X to an address '00008FFF'X of the global memory 212 is managed by ID='000004' with the "update vector" being '100'.

Referring again to FIG. 2, the process in which a lock request is made by using a group of a plurality of identifiers will be described.

In step 1 of FIG. 2, a program on the processor apparatus 100 issues a lock request in accordance with a program on the processor apparatus 120 and a preset ID='000003' in order to access, as memory areas to be shared by the systems, an area of a length '1000'X extending from a precedently reserved address '10004000'X of local memory 206 on an address space and an area of a length '1000'X extending from an address '10005000'X of the local memory 206. Here, the areas managed by the ID='000003' and ID='000004' are to be locked and in this case, the lock request is made in accordance with a representative identifier.

In step 2, the inter-system exclusive state conditioning unit 202 of the processor apparatus 100 obtains a locked resource by using the designated identifier. In other words, the inter-system exclusive state conditioning unit 202 places the ID='000003' in exclusive state. As a result, the ID='000004' is not placed in exclusive state but, because of the agreement that the ID='000003' and ID='000004' are handled in group by any of the processor apparatuses 100 and 120, a locked resource can substantially be obtained for the ID='000004' without making a request for exclusive state of the ID='000004' when the ID='000003' is placed in exclusive state.

Next, in step 3, the update state confirming unit 203 of the processor apparatus 100 decides whether the designated identifier has already been updated by a different system. More particularly, the update state confirming unit 203 checks whether a memory area of global memory 212 on the share system 110 corresponding to the designated identifier is accessed by the different system.

Even when the lock request by the ID='000003' is issued from the processor apparatus 100, the update state confirming unit 203 does not confirm only the representative identifier but checks both the ID's '000003' and '000004' to confirm the update states. In the state shown in FIG. 4, the update vector for the ID='000003' in the share memory managing unit 211 is '000', indicating that it is not updated but the update vector for the ID='000004' is '100', indicating that it is updated by the processor apparatus 120 (SYS B), so that the program proceeds to step 4.

In the step 4, the data transferring unit 204 transfers data from the global memory 212 to the local memory 206.

In step 5, the update vector setting unit 205 resets the update vector for the ID='000004' in the share memory managing unit 211.

Next, in step 6, the processor apparatus 100 completes the lock request and looks up/updates the read-out data.

Through the above lock requesting process, the program on the processor apparatus 100 is permitted to access the plurality of areas corresponding to the identifier. Even when a plurality of units (areas) to be looked up/updated are provided, the overhead due to the exclusive state is incurred only once, proving that it can be reduced.

The program can look up/update the area easily through the procedure similar to that for accessing the area in the system of its own without using any special instructions.

The process for unlock request is the same as that described in connection with FIG. 3. Since only a locked resource is obtained in conformity with a representative identifier, the locked resource is released in step 11 in conformity with only the identifier for which the locked resource is obtained.

According to the present embodiment, the area can be looked up/updated easily through the procedure similar to that for accessing the area in the system of its own without using any special instructions.

In addition, the overhead due to the exclusive state incurred when locked resources are obtained for a plurality of areas can be reduced.

Figure 5:
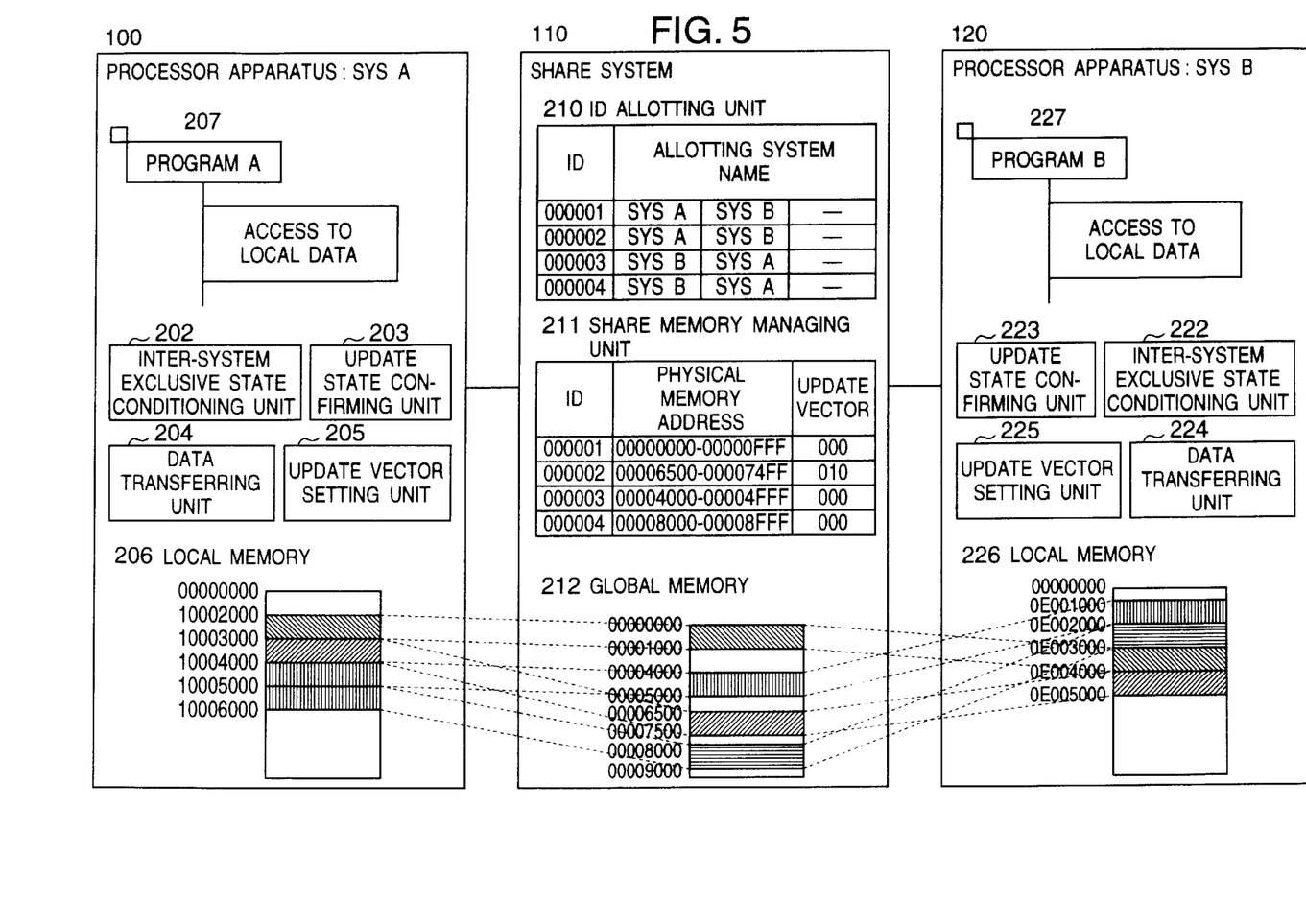
FIG. 5 is a schematic diagram of a composite computer system realizing a data sharing method according to still another embodiment of the present invention.

Referring now to FIG. 5, a method of making the access to the share system asynchronous to the access to the local memory when a program on the processor apparatus looks up/updates the memory shared by the systems will be described.

FIG. 5 schematically shows a composite computer system realizing a data sharing method according to still another embodiment of the present invention. Reference numerals identical to those in FIG. 1 designate identical components which are constructed and function identically and will not be detailed.

On the processor apparatus 100, a program A 207 is operated as a program which operates while looking up/updating the local memory 206 in correspondence to the memory shared by the systems.

It is now assumed that allotment of areas of local memory 206 managed by a local area allotting unit (not shown) in the processor apparatus 100 is similar to that shown in FIG. 4.

On the processor apparatus 120, a program B 227 is operated as a program which operates while looking up/updating the local memory 226 in correspondence to the memory shared by the systems.

The allotment of an area of local memory 226 managed by the local area allotting unit in the processor apparatus 120 is similar to that shown in FIG. 4.

Further, the allotting system name in the identifier allotting unit 210 is similar to that shown in FIG. 4.

Also, the managing condition of the global memory 212 serving as the share memory in the share memory managing unit 211 is similar to that shown in FIG. 4.

Data shared by the program A 207 and program B 227 is unlike user data whose integrity must be ensured throughout all the systems, and includes, for example, busy rates of the CPU's on the processor apparatuses 100 and 120 and operating information of the share resource which is allowed to have a bit of error.

When the data as above is shared, interchange of data occurs periodically and therefore, the overhead due to accessing the share system 110 and the overhead due to the exclusive state are desired to be reduced as far as possible. Accordingly, the lock/unlock request to the share system 110 is not operated on an extension of the operation of each program but data access to the share system 110 is carried out at a period of relatively reduced overhead in accordance with a totally different program to thereby reflect data upon the local memories 206 and 226.

The program A 207 and program B 227 are operated at a timing different from the timing at which data is reflected upon the local memories 206 and 226 and only the local memories 206 and 226 are looked up/updated as necessary.

By making the timing of access to the local memory different from the timing of access to the global memory to perform the asynchronous and non-interlocked process in this manner, the overhead for the shared system can be reduced.

According to the present embodiment, the area can be looked up/updated easily through the procedure similar to that for accessing the area in the system of its own without using any special instructions.

Further, by making the timing at which data is looked up/updated on each computer system different from the timing at which data on the share system is reflected upon the computer system to perform the asynchronous and non-interlocked process, the overhead for the share system can be reduced.

According to the present invention, when the memory is shared by a plurality of computer systems, the area can be looked up/updated through the procedure similar to that for accessing the share area in the conventional system.

We claim:

1. A data sharing method in which data used in common for processor apparatuses of a plurality of computer systems is shared by a share memory in a share system, comprising the steps of:

dividing said share memory in said share system into constant units and causing said share system to control the length of the individual division units by using identifiers which are definitely determined as viewed from said plurality of computer systems and said share system;

when a processor apparatus designates a desired area on an address space in its computer system by using an identifier to obtain a locked resource, causing said processor apparatus to check whether data in a corresponding unit in said share memory is updated and to transfer data in the corresponding unit in said share memory to said address space when the data is updated; and when said processor apparatus releases the locked resource, causing said processor apparatus to transfer the data to the corresponding unit in said share memory if said data in said address space is updated.

2. A data sharing method according to claim 1, wherein in said computer system, said processor apparatus accesses a group of a plurality of identifiers and is caused to obtain a locked resource in said share system by using a representative identifier of the identifier group.

3. A data sharing method according to claim 1, wherein in said computer system, the access timing at which said processor apparatus looks-up/updates data on said computer system is made to be asynchronous to the access timing at which said processor apparatus reflects data upon said share system on said computer system.

4. A data sharing system in which data used in common for processor apparatuses of a plurality of computer systems is shared by a share memory in a share system, comprising:

said share system having its share memory divided into constant units, for managing the individual division units by using identifiers which are definitely determined; and said processor apparatus coupled to said share system and being operative, when designating a desired area on an address space in said computer system by using an identifier to obtain a locked resource, to check whether data in a corresponding unit in said share memory is updated and to transfer the data in the corresponding unit in said share memory to said address space when the data is updated, wherein when releasing the locked resource, said processor apparatus transfers the data to the corresponding unit in said share memory if the data in said address space is updated.

5. A data sharing system according to claim 4, wherein in said computer system, said processor apparatus accesses a group of a plurality of identifiers and obtains a locked resource in said share system by using a representative identifier of the identifier group.

6. A data sharing system according to claim 4, wherein in said computer system, the access timing at which said processor apparatus looks-up/updates data on said computer system is made to be asynchronous to the access timing at which said processor apparatus reflects data upon said share system on said computer system.

* * * * *